(12) United States Patent
Ueta et al.

(10) Patent No.: US 12,141,589 B2
(45) Date of Patent: Nov. 12, 2024

(54) RELATED DATA EXTRACTION APPARATUS, RELATED DATA EXTRACTION SYSTEM, RELATED DATA EXTRACTION METHOD, AND RELATED DATA EXTRACTION PROGRAM

(71) Applicant: Hitachi, Ltd., Tokyo (JP)

(72) Inventors: Taisuke Ueta, Tokyo (JP); Daisuke Ishii, Tokyo (JP); Daisuke Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 17/694,100

(22) Filed: Mar. 14, 2022

(65) Prior Publication Data

US 2023/0025013 A1 Jan. 26, 2023

(30) Foreign Application Priority Data

Jul. 14, 2021 (JP) .................................. 2021-116289

(51) Int. Cl.
*G06F 9/445* (2018.01)
*G06F 16/907* (2019.01)

(52) U.S. Cl.
CPC ........ *G06F 9/44505* (2013.01); *G06F 16/907* (2019.01)

(58) Field of Classification Search
None
See application file for complete search history.

(56) References Cited

U.S. PATENT DOCUMENTS

| 2019/0036830 | A1  | 1/2019 | Yamato |              |
|--------------|-----|--------|--------|--------------|
| 2019/0042133 | A1* | 2/2019 | Peterson | ................ G06F 3/067 |
| 2021/0200755 | A1* | 7/2021 | Curtis | ..................... G06F 16/25 |
| 2022/0247695 | A1* | 8/2022 | Kulkarni | ............... G06F 16/248 |

FOREIGN PATENT DOCUMENTS

JP 2017-167748 A 9/2017

\* cited by examiner

*Primary Examiner* — Alex Gofman
*Assistant Examiner* — Umar Mian
(74) *Attorney, Agent, or Firm* — Crowell & Moring LLP

(57) ABSTRACT

Meta data is provided flexibly according to an application A related data extraction apparatus for extracting related data which is given to data collected from a target system and is related to the data includes: a configuration data accumulation unit that manages configuration information of the target system; a configuration data input unit that accepts input of registration or update of the configuration information; an application linkage unit that accepts a request for the related data given to the data by an application for analyzing the data; and a related data extraction unit that extracts the related data from the configuration information on the basis of the request.

12 Claims, 13 Drawing Sheets

FIG. 4

| GRAPH-FORM DATABASE ID | NODE INFORMATION | SUPPLEMENTARY DATA | UPDATE TIME OF DAY |
|---|---|---|---|
| GDB0001 | G01 | NONE | - |
| | P01 | NONE | - |
| | A01 | A01 TEST PROCESSING IMPLEMENTED DATA | 2021/2/7 08:00:00.000 |
| | | A01 TEST RESULT VALID RANGE DATA | 2021/2/7 08:01:00.000 |
| | A02 | A02 TEST PROCESSING IMPLEMENTED DATA | 2021/2/7 08:02:00.000 |
| | | A02 TEST RESULT VALID RANGE DATA | 2021/2/7 08:03:00.000 |
| | ... | ... | ... |
| GDB0002 | ... | ... | ... |
| ... | | | |
| 401 | 402 | 403 | 404 |

A01 TEST PROCESSING IMPLEMENTED DATA 40311

| PRODUCT ID | TEST 1 IMPLEMENTED | TEST 2 IMPLEMENTED | TEST 3 IMPLEMENTED | TEST 4 IMPLEMENTED |
|---|---|---|---|---|
| S01 | IMPLEMENTED | IMPLEMENTED | IMPLEMENTED | IMPLEMENTED |
| S02 | IMPLEMENTED | NOT IMPLEMENTED | IMPLEMENTED | IMPLEMENTED |
| S03 | IMPLEMENTED | IMPLEMENTED | IMPLEMENTED | IMPLEMENTED |
| ... | ... | ... | ... | ... |

A01 TEST RESULT VALID RANGE DATA 40312

| TEST ITEM | VALID RANGE |
|---|---|
| TEST VALUE 1 | 0-20 |
| TEST VALUE 2 | 0-50 |
| TEST VALUE 3 | 10-100 |
| TEST VALUE 4 | 20-90 |

A02 TEST PROCESSING IMPLEMENTED DATA 40321

| PRODUCT ID | TEST :1 IMPLEMENTED | TEST :2 IMPLEMENTED |
|---|---|---|
| S01 | IMPLEMENTED | IMPLEMENTED |
| S02 | IMPLEMENTED | IMPLEMENTED |
| S03 | IMPLEMENTED | IMPLEMENTED |
| ... | ... | ... |

A02 TEST RESULT VALID RANGE DATA 40322

| TEST ITEM | VALID RANGE |
|---|---|
| TEST VALUE 1 | 10-30 |
| TEST VALUE 2 | 10-60 |

FIG. 5

RELATED DATA REQUEST SCREEN — 51-1

MANAGEMENT FLOW ID [ F001 ] — 511-1

INFORMATION RELATED TO WHICH DATA IS REQUESTED? — 512-1

| NODE | INFORMATION | (ASSET NODE SELECTABLE) |
|---|---|---|
| ☐ GW | ☐ name | ☐ TEST PROCESSING |
| ☐ PLC | ☑ ID | VALID/INVALID |
| ☑ Asset | | |
| ☐ STEP | | |
| ☐ PRODUCT | | |

SEARCH SORT KEY 1 — 513-1

| NODE | UNIT |
|---|---|
| ☐ GW | ☐ ALL |
| ☐ PLC | ☑ ID |
| ☐ Asset | |
| ☐ STEP | |
| ☑ PRODUCT | |

SEARCH SORT KEY 2 (WHEN COMBINED) — 514-1

| NODE | UNIT |
|---|---|
| ☐ GW | ☐ ALL |
| ☐ PLC | ☐ ID |
| ☐ Asset | |
| ☐ STEP | |
| ☐ PRODUCT | |

OUTPUT REQUEST (KEY WORD SEARCH) — 515-1

▼ SEQUENTIAL ORDER ( REQUEST BUTTON ) — 516-1

FIG. 6

RELATED DATA REQUEST SCREEN

MANAGEMENT FLOW ID  [ F001 ]   (512-1)

INFORMATION RELATED TO WHICH DATA IS REQUESTED? (512-2)

| NODE | INFORMATION | (ASSET NODE SELECTABLE) |
|---|---|---|
| ☐ GW | ☐ name | ☑ TEST PROCESSING |
| ☐ PLC | ☐ ID | VALID/INVALID |
| ☑ Asset | | |
| ☐ STEP | | |
| ☐ PRODUCT | | |

SEARCH SORT KEY 1 (513-2)

| NODE | UNIT |
|---|---|
| ☐ GW | ☐ ALL |
| ☐ PLC | ☑ ID |
| ☑ Asset | |
| ☐ STEP | |
| ☐ PRODUCT | |

SEARCH SORT KEY 2 (WHEN COMBINED) (514-2)

| NODE | UNIT |
|---|---|
| ☐ GW | ☐ ALL |
| ☐ PLC | ☑ ID |
| ☐ Asset | |
| ☐ STEP | |
| ☑ PRODUCT | |

OUTPUT REQUEST (KEY WORD SEARCH) (515-2)

▼

( REQUEST BUTTON )  (516-2)

FIG. 8

| MANAGEMENT FLOW ID | DATA EXTRACTION REQUIREMENT | | | RULE ID |
|---|---|---|---|---|
| | OUTPUT INFORMATION | SEARCH SORT KEY | ADDITIONAL REQUEST | |
| F001 | TEST PROCESSING | ASSET ID & PRODUCT ID | — | R001 |
| F001 | Asset ID | PRODUCT ID | SEQUENTIAL ORDER | R002 |
| ... | | | | |

801 / 802 / 803 / 804 / 805 → 8

| RULE ID | DATA SEARCH TARGET | DATA ACQUISITION CONDITION | RELATED DATA COUPLING TABLE ID | CONFIGURATION TIME OF DAY |
|---|---|---|---|---|
| R001 | GRAPH-FORM DATABASE ID:GDB0001 SUPPLEMENTARY DATA MANAGEMENT TABLE | ACQUIRE TEST PROCESSING IMPLEMENTED DATA AND TEST RESULT VALID RANGE DATA WHICH ARE RETAINED BY ASSET. | T001 | 2021/2/7 08:03:00.000 |
| R002 | GRAPH-FORM DATABASE ID:GDB0001 CONFIGURATION DATA | ACQUIRE NODE(S) IDENTIFIED WITH PRODUCT ID, WHICH IS SEARCH SORT KEY, AND ASSET ID, WHICH IS OUTPUT INFORMATION, AND INFORMATION OF CONNECTION RELATION. IF THERE IS NO RELEVANT SEQUENTIAL ORDER CONNECTION, SUPERIOR OR INFERIOR SEQUENTIAL ORDER IS TRACKED. | T002 | 2021/2/7 09:10:00.000 |
| ... | | | | |

| RELATED DATA COUPLING TABLE ID | T001 | | |
|---|---|---|---|
| MANAGEMENT FLOW ID | F001 | | |
| CONFIGURATION TIME OF DAY | 2021/2/7 08:03:00.000 | | |
| SEARCH SORT KEY | | EXTRACTED VALUE | |
| Asset ID | PRODUCT ID | TEST: IMPLEMENTED (1) / NOT IMPLEMENTED(0) | TEST VALUE: VALID RANGE |
| A01 | S01 | TEST 1: 1, TEST 2: 1, TEST 3: 1, TEST 4: 1 | TEST 1: 0-20, TEST 2: 0-50, TEST 3: 10-100, TEST 4: 20-90 |
| | S02 | TEST 1: 1, TEST 2: 0, TEST 3: 1, TEST 4: 1 | TEST 1: 0-20, TEST 2: 0-50, TEST 3: 10-100, TEST 4: 20-90 |
| | S03 | TEST 1: 1, TEST 2: 1, TEST 3: 1, TEST 4: 1 | TEST 1: 0-20, TEST 2: 0-50, TEST 3: 10-100, TEST 4: 20-90 |
| | ... | ... | ... |
| ... | ... | ... | ... |

| RELATED DATA COUPLING TABLE ID | T002 |
|---|---|
| MANAGEMENT FLOW ID | F001 |
| CONFIGURATION TIME OF DAY | 2021/2/7 09:10:00.000 |
| SEARCH SORT KEY | EXTRACTED VALUE |
| PRODUCT ID | Asset ID : SEQUENTIAL ORDER |
| S01 | A01, A02, A03, A04, A05, A06, A07, A08 |
| S02 | A01, A02, A04, A05, A06, A08 |
| ... | ... |

FIG. 12

DATA BEFORE ASSIGNING RELATED DATA 1200-1

{ "Asset ID": "A01",
"PRODUCT ID": "S01",
"TEST 1 RESULT": "10",
"TEST 2 RESULT": "20",
"TEST 3 RESULT": "15",
"TEST 4 RESULT":"30" }

1200-2

{ "Asset ID": "A01",
"PRODUCT ID": "S02",
"TEST 1 RESULT":"15",
"TEST 2 RESULT": "0",
"TEST 3 RESULT":"17",
"TEST 4 RESULT":"32" }

1200-3

{ "Asset ID": "A01",
"PRODUCT ID": "S03",
"TEST 1 RESULT": "12",
"TEST 2 RESULT":"19",
"TEST 3 RESULT": "-5",
"TEST 4 RESULT":"31" }

DATA AFTER ASSIGNING RELATED DATA (RULE ID: R001)

1201-1

{ "Asset ID": "A01",
"PRODUCT ID": "S01",
"TEST 1 RESULT": "10",
"TEST 2 RESULT": "20",
"TEST 3 RESULT": "15",
"TEST 4 RESULT": "30",
"TEST 1 IMPLEMENTED ":"1",
"TEST 2 IMPLEMENTED ":"1",
"TEST 3 IMPLEMENTED ":"1",
"TEST 4 IMPLEMENTED ":"1",
"TEST 1 RANGE ": "0-20",
"TEST 2 RANGE ": "0-50",
"TEST 3 RANGE ": "10-100",
"TEST 4 RANGE ": "20-90" }

1201-2

{ "Asset ID": "A01",
"PRODUCT ID": "S02",
"TEST 1 RESULT": "15",
"TEST 2 RESULT": "0",
"TEST 3 RESULT": "17",
"TEST 4 RESULT": "32",
"TEST 1 IMPLEMENTED ":"1",
"TEST 2 IMPLEMENTED ":"0",
"TEST 3 IMPLEMENTED ":"1",
"TEST 4 IMPLEMENTED ":"1",
"TEST 1 RANGE ": "0-20",
"TEST 2 RANGE ": "0-50",
"TEST 3 RANGE ": "10-100",
"TEST 4 RANGE ": "20-90" }

1201-3

{ "Asset ID": "A01",
"PRODUCT ID": "S03",
"TEST 1 RESULT": "12",
"TEST 2 RESULT": "19",
"TEST 3 RESULT": "-5",
"TEST 4 RESULT": "31",
"TEST 1 IMPLEMENTED ":"1",
"TEST 2 IMPLEMENTED ":"1",
"TEST 3 IMPLEMENTED ":"1",
"TEST 4 IMPLEMENTED ":"1",
"TEST 1 RANGE ": "0-20",
"TEST 2 RANGE ": "0-50",
"TEST 3 RANGE ": "10-100",
"TEST 4 RANGE ": "20-90" }

DATA AFTER ASSIGNING RELATED DATA (RULE ID: R002)

1202-1

{ "Asset ID": "A01",
"PRODUCT ID": "S01",
"TEST 1 RESULT": "10",
"TEST 2 RESULT": "20",
"TEST 3 RESULT": "15",
"TEST 4 RESULT": "30",
"PASSING APPARATUSES ": "A01, A02, A03, A04, A05, A06, A07, A08" }

1202-2

{ "Asset ID": "A01",
"PRODUCT ID": "S02",
"TEST 1 RESULT": "15",
"TEST 2 RESULT": "0",
"TEST 3 RESULT": "17",
"TEST 4 RESULT": "32",
"PASSING APPARATUSES ": "A01, A02, A04, A05, A06, A08" }

| EXTRACTION RULE | Version | CREATION TIME OF DAY | GENERATED DATA | CONFIGURATION TIME OF DAY |
|---|---|---|---|---|
| R001 | Ver 1 | 2021/2/9 13:00:00.000 | (RETAIN T001 CONTENT AS OF VER 1 CREATION TIME OF DAY) | 2021/2/7 08:03:00.000 |
| | Ver 2 | 2021/2/9 15:01:30.000 | (RETAIN T001 CONTENT AS OF VER 2 CREATION TIME OF DAY) | 2021/2/9 15:01:00.000 |
| R002 | Ver 1 | 2021/2/9 14:00:00.000 | (RETAIN T002 CONTENT AS OF VER 1 CREATION TIME OF DAY) | 2021/2/7 09:10:00.000 |
| ... | ... | ... | ... | ... |
| ... | ... | ... | ... | ... |

1301  1302  1303  1304  1305

<UPDATE EXAMPLE>

A01 TEST RESULT VALID RANGE DATA 40312

2021/2/7 08:01:00.000

| TEST ITEM | VALID RANGE |
|---|---|
| TEST VALUE 1 | 0-20 |
| TEST VALUE 2 | 0-50 |
| TEST VALUE 3 | 10-100 |
| TEST VALUE 4 | 20-90 |

⇨

2021/2/9 15:01:00.000

| TEST ITEM | VALID RANGE |
|---|---|
| TEST VALUE 1 | 0-20 |
| TEST VALUE 2 | 5-55 |
| TEST VALUE 3 | 10-80 |
| TEST VALUE 4 | 20-90 |

SUPPLEMENTARY DATA MANAGEMENT TABLE 4

| NODE INFORMATION | SUPPLEMENTARY DATA | UPDATE TIME OF DAY |
|---|---|---|
| A01 | A01 TEST PROCESSING IMPLEMENTED DATA | 2021/2/7 08:00:00.000 |
| | A01 TEST RESULT VALID RANGE DATA | 2021/2/7 08:01:00.000 →2021/2/9 15:01:00.000 |

DATA EXTRACTION RULE 82

| RULE ID | DATA SEARCH TARGET | DATA ACQUISITION CONDITION | RELATED DATA COUPLING TABLE ID | CONFIGURATION TIME OF DAY |
|---|---|---|---|---|
| R001 | GRAPH-FORM DATABASE ID : GDB0001 SUPPLEMENTARY DATA MANAGEMENT TABLE | ACQUIRE TEST PROCESSING IMPLEMENTED DATA AND TEST RESULT VALID RANGE DATA WHICH ARE RETAINED BY ASSET. | T001 | 2021/2/7 08:03:00.000 →2021/2/9 15:01:00.000 |

RELATED DATA EXTRACTION APPARATUS, RELATED DATA EXTRACTION SYSTEM, RELATED DATA EXTRACTION METHOD, AND RELATED DATA EXTRACTION PROGRAM

INCORPORATION BY REFERENCE

This application claims priority based on Japanese patent application(s), No. 2021-116289 filed on Jul. 14, 2021, the entire contents of which are incorporated herein by reference.

BACKGROUND

The present invention relates to a related data extraction apparatus, a related data extraction system, a related data extraction method, and a related data extraction program.

With the development of IoT (Internet of Things), there has appeared a service for providing solutions with an added value by analyzing data collected from devices such as sensors. When the IoT is applied to a factory, sensor data are collected from sensors which are attached to manufacturing equipment and workers within the factory and the status and efficiency of manufacturing steps of the factory are visualized and analyzed, thereby detecting abnormalities at a manufacturing site, improving production plans and the manufacturing steps, and enhancing production techniques of the workers.

As a specific example of the solution of applying the IoT to the factory, there is a solution to analyze the status and efficiency of production lines of the factory by associating sensor data collected from equipment within the factory with configuration data of the production lines. The configuration data of the production lines include a sequential connection order of the equipment installed in the production lines, types of the equipment used, products to be produced, and so on. When associating the sensor data with the configuration data of the production lines, it is required that appropriate data for an application which performs the analysis can be provided.

For example, PTL 1 mentioned below discloses a "data flow control apparatus comprising: a device-side meta data acquisition means of acquiring device-side meta data including items indicating specifications of data which can be provided by a device with respect to each of a plurality of devices; an application-side meta data acquisition means of acquiring application-side meta data including items indicating specifications of data requested by an application with respect to the application which uses the data provided by the device; a storage means of storing the device-side meta data and the application-side meta data; a matching means of performing matching between the application-side meta data and the device-side meta data and thereby extracting a combination of the application and a device capable of providing data which satisfies specifications requested by the application; a data flow control means of generating a data flow control command which specifies the device extracted by the matching means and the application, wherein when the combination is extracted on the basis of whether they match each other with respect to a matching target item among the items which the device-side meta data and the application-side meta data have, and if there is any item regarding which a discrepancy has occurred, the matching means acquires information indicating whether or not the item regarding which the discrepancy has occurred can be changed or not, and changes the item regrading which the discrepancy has occurred, on the basis of the information."

CITATION LIST

Patent Literature

PTL 1: Japanese Patent Application Laid-Open (Kokai) Publication No. 2017-167748

SUMMARY

However, the technology described in PTL 1 is designed for the purpose of matching between the application-side meta data and the device-side meta data and does not disclose a mechanism for adding the meta data or changing the meta data to be given upon request from the application side, so that there is still room for improvement in flexibility of provision of the meta data to the application.

The present invention was devised in light of the above-described problem and it is one of objects to flexibly provide the meta data according to the application.

In order to solve the above-described problem, there is provided according to an aspect of the present invention a related data extraction apparatus for extracting related data which is given to data collected from a target system and is related to the data, wherein the related data extraction apparatus includes: a configuration data accumulation unit that manages configuration information of the target system; a configuration data input unit that accepts input of registration or update of the configuration information; an application linkage unit that accepts a request for the related data given to the data by an application for analyzing the data; and a related data extraction unit that extracts the related data from the configuration information on the basis of the request.

According to the present invention, for example, it is possible to flexibly provide the meta data according to the application. Any problems, configurations, and advantageous effects other than those mentioned above will be made clear by a description of embodiments indicated below.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 4 is an explanatory diagram illustrating an example of a supplementary data management table;

FIG. 5 is an explanatory diagram illustrating an example of a related data request screen displayed on a screen display unit;

FIG. 6 is an explanatory diagram illustrating an example of the related data request screen displayed on the screen display unit;

FIG. 8 is an explanatory diagram illustrating an example of data extraction rules;

FIG. 9 is an explanatory diagram illustrating an example of a related data coupling table;

FIG. 12 is an explanatory diagram illustrating an example of giving the related data to data collected by the data processing platform; and FIG. 13 is an explanatory diagram illustrating an example of version management of the related data extraction apparatus.

DESCRIPTION OF EMBODIMENTS

Figure 1:
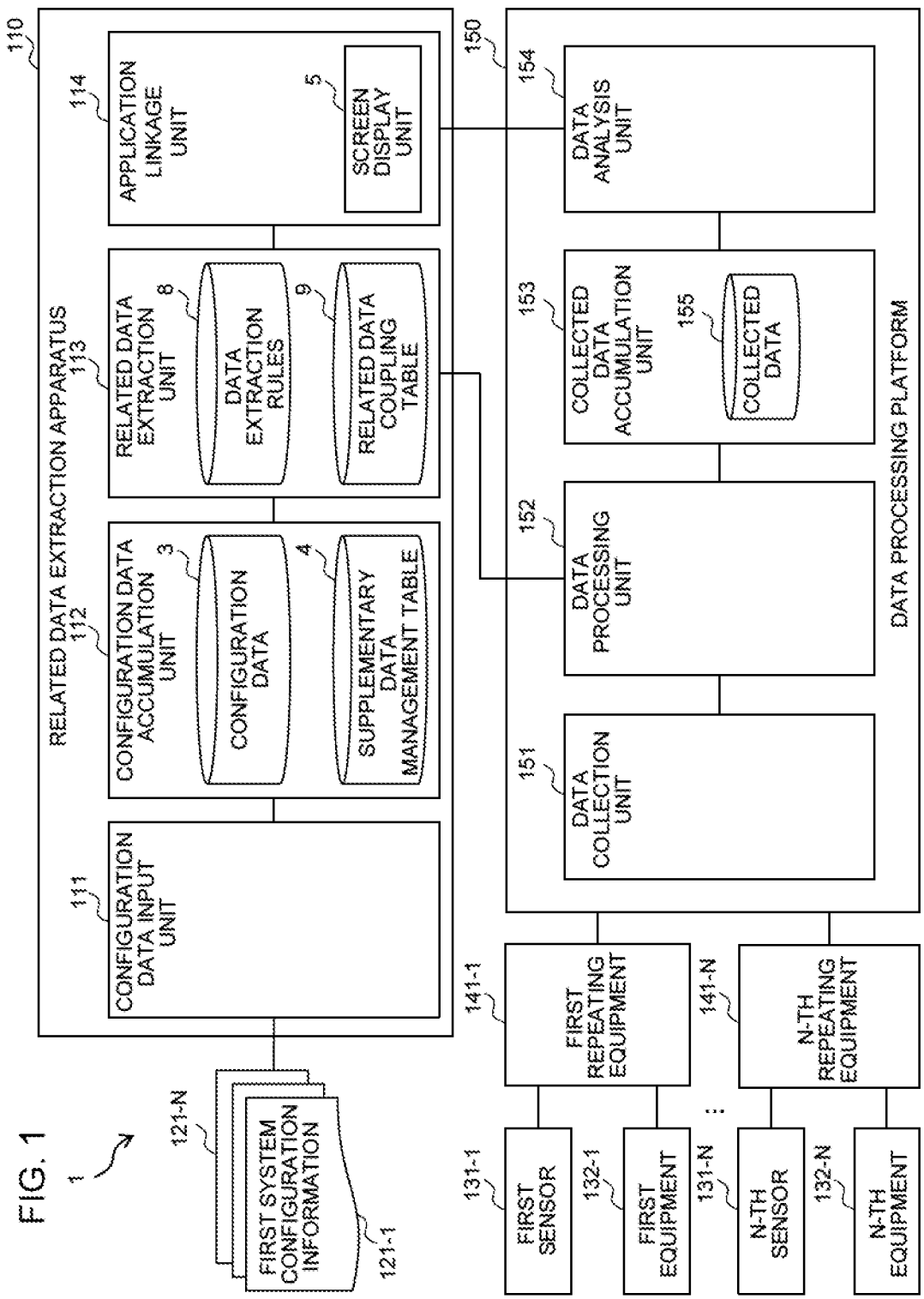
FIG. 1 is a diagram illustrating a configuration example of a related data extraction system including a related data extraction apparatus.

Embodiments of the present invention will be explained below with reference to the drawings. However, the present invention shall not be interpreted by being limited to the described content of the embodiments indicated below. Those skilled in the art would easily understand that a specific configuration of the present invention can be changed within the scope not departing from the idea and gist of the present invention (for example, by combining at least part of a certain embodiment with another embodiment).

In the following description, the same reference numerals will be assigned to configurations or functions which are the same or similar to each other, and any redundant explanation will be omitted. Furthermore, even if different branch numbers are attached to the same reference numeral, but if they are not distinguished from each other, the reference numeral without the branch numbers will be used.

Furthermore, in the description indicated below, any subsequent embodiment will be described by focusing on the difference(s) from any embodiment which has already been described, and an explanation about any redundant part(s) will be omitted.

In the description indicated below, it is assumed that various kinds of data and information such as "configuration data 3," a "supplementary data management table 4," "data extraction rules 8," a "related data coupling table 9," and "collected data 155" are stored in specified storage areas. Furthermore, if they are simply described as the "configuration data 3," the "supplementary data management table 4," the "data extraction rules 8," the "related data coupling table 9," the "collected data 155," and so on, they may sometimes refer to a storage unit where the relevant data is stored.

In the description indicated below, information will be illustrated in a table form, but the information may be expressed in any form other than the table form.

<Overall Configuration>

FIG. 1 is a diagram illustrating a configuration example of a related data extraction system 1 including a related data extraction apparatus 110. The related data extraction system 1 includes the related data extraction apparatus 110, first system configuration information 121-1 to N-th system configuration information 121-N (N is an arbitrary natural number equal to or more than 2), first equipment 132-1 to N-th equipment 132-N, a first sensor 131-1 to an N-th sensor 131-N, first repeating equipment 141-1 to N-th repeating equipment 141-N, and a data processing platform 150. The first system configuration information 121-1 to the N-th system configuration information 121-N will be collectively referred to as the "system configuration information 121." Furthermore, the first sensor 131-1 to the N-th sensor 131-N will be collectively referred to as the "sensor 131," the first equipment 132-1 to the N-th equipment 132-N will be collectively referred to as the "equipment 132," and the first repeating equipment 141-1 to the N-th repeating equipment 141-N will be collectively referred to as "the repeating equipment 141."

The sensor 131 measures a temperature, humidity, vibrations, an electric current, a position of the equipment 132 and outputs the measurement results as sensor data. The equipment 132 is, for example, a manufacturing apparatus installed in a production line and is connected to a PLC (Programmable Logic Controller), etc. which is not illustrated in the drawing, and the apparatus status, execution results, and so on are acquired by the sensor 131. The sensor 131 may be built in the equipment 132. The sensor 131 and the equipment 132 are connected via a factory network including the PLC or the like to the repeating equipment 141 and collected data such as the sensor data, the apparatus status, and the execution results are transferred to the data processing platform 150. Each of the sensor 131 and the equipment 132 may be configured from a plurality of sensors/equipment.

The system configuration information 121 includes information of types of the equipment 132 used and types of the sensor 131, detailed information of each device, the sequential connection order, information of products to be manufactured, and so on. It may be assumed that a j-th sensor 131-$j$, j-th equipment 132-$j$, and j-th repeating equipment 141-$j$ constitute one factory network (a j-th factory network), which is managed by j-th system configuration information 121-$j$ (j is an integer equal to or more than 1). The j-th factory network is a target system for acquiring the sensor data and is configured by including one or more j-th sensors 131-$j$, one or more pieces of j-th equipment 132-$j$ and one or more pieces of j-th repeating equipment 141-$j$.

The data processing platform 150 includes a data collection unit 151, a data processing unit 152, a collected data accumulation unit 153, and a data analysis unit 154. The data collection unit 151 collects data transferred from the repeating equipment 141. The data collected by the data collection unit 151 is called "collected data." The data processing unit 152 shapes the collected data. The shaped collected data is accumulated in the collected data 155 of the collected data accumulation unit 153 and is used for analysis by the data analysis unit 154. The data processing platform 150 manages the collected data, which is transferred from the repeating equipment 141, as a sequence of flow. For example, the collected data which is managed by the first system configuration information 121-1 and acquired from the first sensor 131-1 and the first equipment 132-1 may be managed as a first flow.

The related data extraction apparatus 110 is provided, for example, as an enhancement function of the related data extraction system 1. The related data extraction apparatus 110 includes a configuration data input unit 111, a configuration data accumulation unit 112, a related data extraction unit 113, and an application linkage unit 114.

The configuration data input unit 111 takes in the system configuration information 121 and accumulates it in the configuration data accumulation unit 112. In this embodiment, equipment information about types, etc. of the equipment 132 and configuration information of the system indicating the sequential connection order and the connection configuration of the equipment 132 and the sensors 131 are managed by the configuration data 3 and the detailed information of each device of the sensor 131 and the equipment 132 is managed by the supplementary data management table 4.

The application linkage unit 114 includes a screen display unit 5 and accepts a request(s) for the related data to be extracted (that is, meta data). The related data extraction unit 113 extracts the related data in response to the request accepted by the application linkage unit 114. The related data extraction unit 113 includes data extraction rules 8 and causes the related data, which satisfies the request accepted by the application linkage unit 114, from the information retained in the configuration data 3 and the supplementary data management table 4 to be retained in the related data coupling table 9.

When accepting the request for the related data to be added for the purpose of analysis from the data analysis unit 154, the related data extraction apparatus 110 extracts the relevant related data and outputs it to the data processing unit 152. The collected data to which the related data is given by the data processing unit 152 is accumulated in the collected data 155 and is used for the analysis by the data analysis unit 154.

<Hardware Configuration of Related Data Extraction Apparatus>

Figure 2:
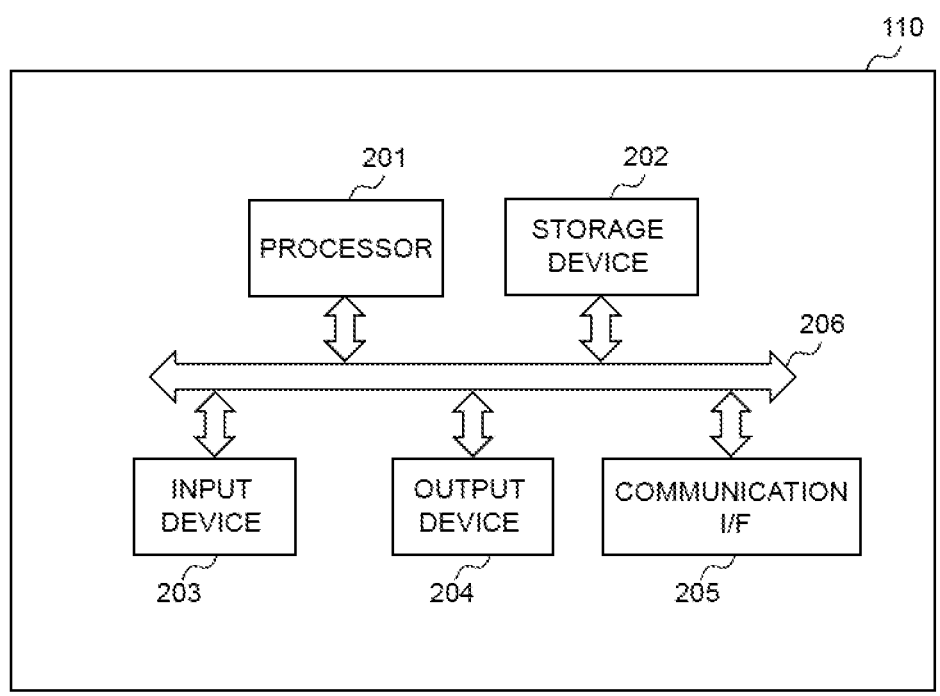
FIG. 2 is a diagram illustrating a hardware configuration example of the related data extraction apparatus.

FIG. 2 is a diagram illustrating a hardware configuration example of the related data extraction apparatus 110. The related data extraction apparatus 110 includes a processor 201, a storage device 202, an input device 203, an output device 204, and a communication interface (communication I/F) 205. The processor 201, the storage device 202, the input device 203, the output device 204, and the communication I/F 205 are connected with a bus 206. The processor 201 controls the related data extraction apparatus 110.

The storage device 202 is a work area for the processor 201. Furthermore, the storage device 202 is a non-transitory or transitory recording medium which stores various kinds of programs and data. Examples of the storage device 202 include, for example, a ROM (Read Only Memory), a RAM (Random Access Memory), an HDD (Hard Disk Drive), and a flash memory. The input device 203 inputs data. Examples of the input device 203 include, for example, a keyboard, a mouse, a touch panel, a numeric keypad, and a scanner. The output device 204 outputs data. Examples of the output device 204 include, for example, a display and a printer. The communication I/F 205 connects to the network and transmits/receives data.

Incidentally, each hardware of the processor 201, the storage device 202, the input device 203, the output device 204, and the communication I/F 205 which constitute the related data extraction apparatus 110 may be configured from a plurality of devices.

<Configuration Data>

Figure 3:
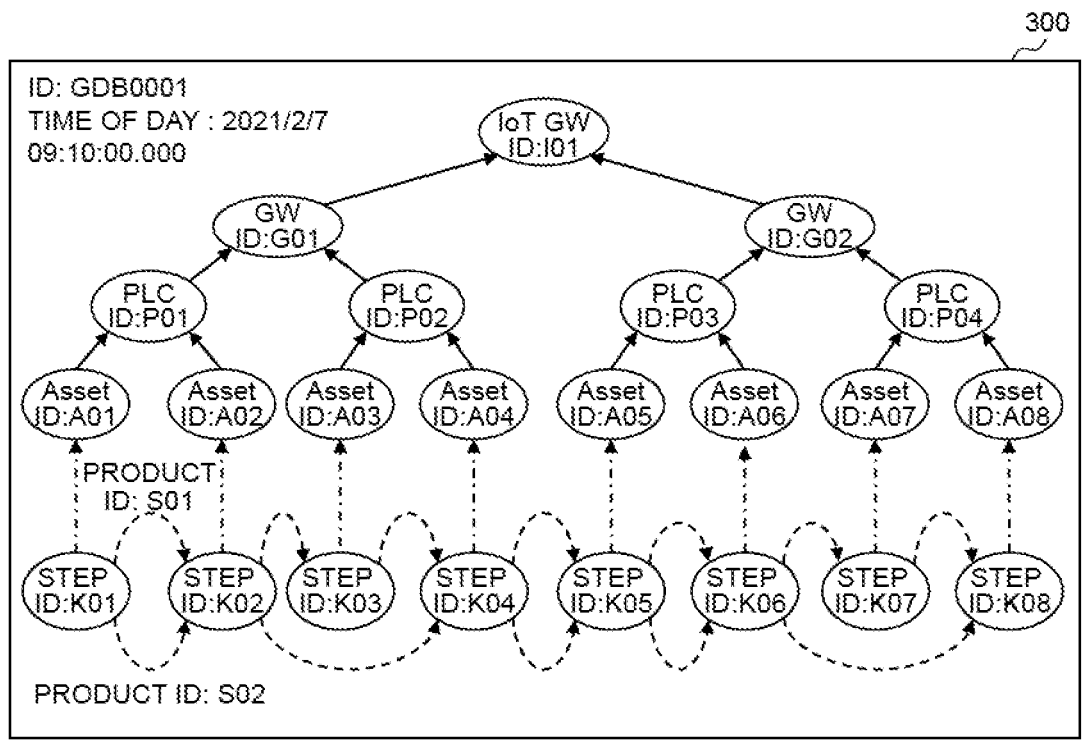
FIG. 3 is an explanatory diagram illustrating an example of configuration data.

FIG. 3 is an explanatory diagram illustrating an example of the configuration data 3. The configuration data 3 is expressed as, for example, a table including fields of a time of day 301 and a graph-form database ID 302. The time of day 301 is a specified time of day when the graph-form database ID 302 was saved. The time of day 301 may be the time of a configuration change or the time of a change of registered information. The graph-form database ID 302, that is, the system configuration information 121 is registered regularly or irregularly.

The graph-form database ID 302 is an identifier of a graph-form database indicating the types and the sequential connection order of the sensors 131, the equipment 132, etc. in the system configuration information 121. Every time the related data extraction apparatus 110 creates or updates the configuration data 3 as triggered by input of the system configuration information 121, an entry is added to the table of the configuration data 3. For example, it may be assumed that an entry whose graph-form database ID 302 is GDB0001 was added as triggered by the input of the first system configuration information 121-1 as explained in FIG. 1.

Furthermore, it is possible to check the content of the system configuration information 121 as illustrated in a reference example 300 by referring to the graph-form database ID 302 of the configuration data 3. The reference example 300 illustrates an example of the content of the entry whose graph-form database ID 302 is GDB0001. In the graph form, each of an IoT GW (Gateway), GW, PLC, Assets, and steps are managed as a node surrounded with one circle and the relevance between nodes is expressed by connecting the nodes with arrows. The Assets are the sensors 131 and the equipment 132 and the IoT GW and GW correspond to the repeating equipment 141. For example, a solid line arrow(s) connecting the IoT GW, GW, PLC, and Assets indicates a physical connection relation. A long-dashed, short-dashed line arrow(s) connecting an Asset and a step indicates a logical relation indicating the relevant Asset corresponding to one step, and a broken line arrow(s) connecting steps indicates a logical relation of the sequential step order for each product ID.

<Supplementary Data Management Table>

FIG. 4 is an explanatory diagram illustrating an example of the supplementary data management table 4. The supplementary data management table 4 stores the detailed information of each device of the sensors 131 and the equipment 132 which are used in the system configuration information 121.

The supplementary data management table 4 is expressed as, for example, a table including fields of a graph-form database ID 401, node information 402, supplementary data 403, and an update time of day 404. The graph-form database ID 401 corresponds to the graph-form database ID 302 of the configuration data 3 illustrated in FIG. 3 and illustrates association between the supplementary data management table 4 and the configuration data 3. Regarding the node information 402, ID's of various types of nodes such as the IoT GW, GW, PLC, and Assets are registered. Regarding the supplementary data 403, the detailed information of each device of the sensors 131 and the equipment 132 may be registered or reference locations of the detailed information of these devices may be registered. The update time of day 404 is a specified time of day when the supplementary data 403 was registered or updated.

FIG. 4 illustrates an example where A01 test processing implemented data 40311 and A01 test result valid range data 40312 are registered as the supplementary data 403 in an Asset whose ID is A01 and A02 test processing implemented data 40321 and A02 test result valid range data 40322 are registered as the supplementary data 403 in an Asset whose ID is A02 in the database whose graph-form database ID 401 is GDB0001.

The A01 test processing implemented data 40311 shows an example of having information indicating whether or not four tests, Test 1 to Test 4, to be executed by the Asset with the ID "A01" should be implemented for each product ID such as S01 to S03. The A01 test result valid range data 40312 shows an example of having information indicating a valid range of test results for the four tests Test 1 to Test 4 executed by the Asset with the ID "A01." The A02 test processing implemented data 40321 shows an example of having information indicating whether or not two tests, Test 1 and Test 2, to be executed by the Asset with the ID "A02" should be implemented for each product ID such as S01 to S03. The A02 test result valid range data 40322 shows an example of having information indicating a valid range of test results for the two tests Test 1 and Test 2 executed by the Asset with the ID "A02." Incidentally, it may be assumed that similar supplementary data 403 are registered for Assets whose ID's are A03 to A08 although they are not illustrated in FIG. 4.

Consequently, in this embodiment, the system configuration information 121 is divided into two data types, that is, the configuration data and the supplementary data, which are stored in the two storage units, that is, the configuration data 3 and the supplementary data management table 4. However, without limitation to this example, there may be n pieces (n is an integer equal to or more than 3) of data types and the data may be divided on a data type basis and stored in n pieces of storage units.

<Related Data Request Screen>

FIG. 5 and FIG. 6 are explanatory diagrams illustrating examples of related data request screens (51-1 and 51-2) respectively displayed on the screen display unit 5. The related data request screen 51-1 and the related data request screen 51-2 will be collectively referred to as the "related data request screen 51." On the related data request screen 51, information indicating, for example, whether information related to which data is requested, what is a search sort key, and what is a request upon output can be input for each flow managed by the data processing platform 150.

The related data request screen 51-1 illustrated in FIG. 5 includes a 1st input field 511-1 to a 5th input field 515-1 and a request button 516-1. Identification information of a managed flow can be input to the 1st input field 511-1. Information indicating the information related to which data is requested can be input to the 2nd input field 512-1. Selections of which test processing implemented data and test result valid range data are to be acquired when selecting the Asset node can be input to the 2nd input field 512-1.

Information of the search sort key when acquiring the information requested in the 2nd input field 512-1 can be input to the 3rd input field 513-1. The information of the search sort key can be also input to the 4th input field 514-1 and the 4th input field 514-1 may be used in combination with the 3rd input field 513-1 when subdividing the search sort key. The request upon output can be input to the 5th input field 515-1 and, for example, the sequential order relation of the information requested in the 2nd input field 512-1 may be requested by the key word search.

FIG. 5 illustrates an example where "F001" is input to the 1st input field 511-1, an "Asset ID" is input to the 2nd input field 512-1, a "Product ID" is input to the 3rd input field 513-1, and the "sequential order" is input to the 5th input field 515-1. When the request button 516-1 is executed, the application linkage unit 114 notifies the related data extraction unit 113 of a related data extraction request by setting the management flow as "F001," the search sort key as the "Product ID," the output information as the "Asset ID," and the additional request upon output as the "sequential order."

The related data request screen 51-2 illustrated in FIG. 6 includes a 1st input field 511-2 to a 5th input field 515-2 and a request button 516-2. The same information as the 1st input field 511-1 to the 5th input field 515-1 illustrated in FIG. 5 can be input to the 1st input field 511-2 to the 5th input field 515-2.

FIG. 6 illustrates an example where "F001" is input to the 1st input field 511-2, "Asset test processing" is input to the 2nd input field 512-2, the "Asset ID" is input to the 3rd input field 513-2, and the "Product ID" is input to the 4th input field 514-2. When the request button 516-2 is executed, the application linkage unit 114 notifies the related data extraction unit 113 of a related data extraction request by setting the management flow as "F001," the search sort key as the "Asset ID & Product ID," the output information as the "Test Processing" (the test processing implemented data and the test result valid range data), and the additional request upon "None (which may be a blank or the like)." Regarding the "Test Processing" which is the output information, the test processing implemented data and the test result valid range data may be made individually selectable.

<Configuration Management Screen>

Figure 7:
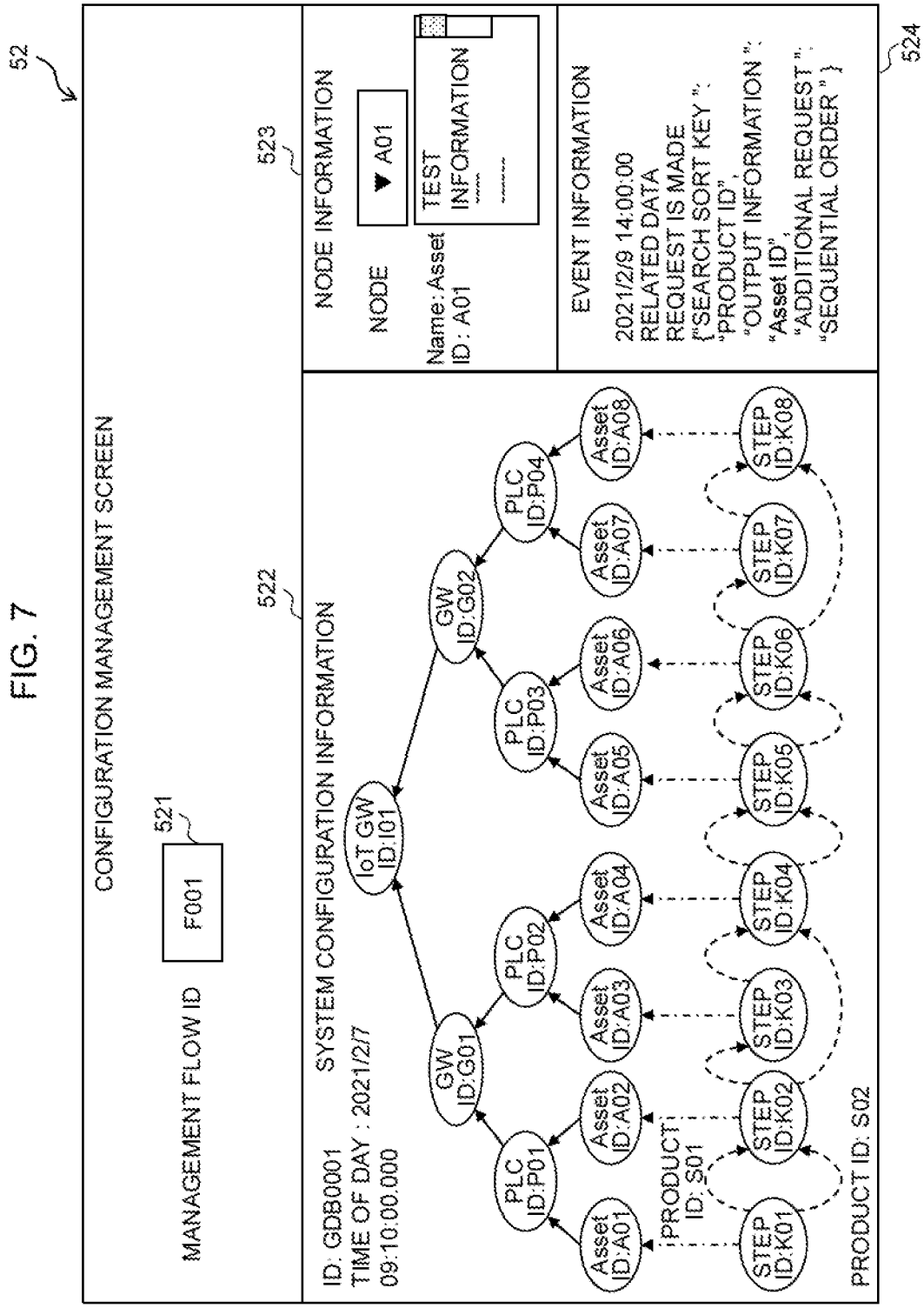
FIG. 7 is an explanatory diagram illustrating an example of a configuration management screen displayed on the screen display unit.

FIG. 7 is an explanatory diagram illustrating an example of a configuration management screen 52 displayed on the screen display unit 5. The configuration management screen 52 includes an input field 521 and a 1st display field 522 to a 3rd display field 524.

Identification information of a managed flow can be input to the input field 521. The content of the system configuration information 121 can be checked in the 1st display field 522 as illustrated in the reference example 300 in FIG. 3. The content of each node information configured in the 1st display field 522 can be checked in the 2nd display field 523. The 2nd display field 523 can display node information corresponding to the identification information of the node which is input to the node selection field, for example, the supplementary data (the A01 test processing implemented data 40311, A01 test result valid range data 40312, etc. when A01 is input in the node selection field) described in the supplementary data management table 4. The 3rd display field 524 can display information of the related data request accepted from the related data request screen 51 as event information. FIG. 7 shows an example where the information of the requested search sort key as the "Product ID," the output information as the "Asset ID," and the additional request upon output as the "sequential order," which is requested from the related data request screen 51-1 as illustrated in FIG. 5 is displayed as a text. In the example in FIG. 7, the content of an entry on the second row of the data extraction rules 8 described below is displayed. The 3rd display field 524 may display other information such as log information.

<Data Extraction Rules>

FIG. 8 is an explanatory diagram illustrating an example of the data extraction rules 8. The data extraction rules 8 save the content of the related data request for each application. The data extraction rules 8 are expressed as a table including fields of a management flow ID 801, output information 802, a search sort key 803, an additional request 804, and a rule ID 805. The management flow ID 801 to the additional request 804 respectively retain information corresponding to the management flow ID, the output information, the search sort key, and the additional request which are reported as data extraction requirements from the application linkage unit 114. The rule ID 805 is an identifier of a rule for extracting the related data on the basis of the data extraction requirements.

Furthermore, the data extraction rules 8 include a rule search table 82 to manage rules for extracting the related data. the rule search table 82 is expressed as a table including fields of a rule ID 821, a data search target 822, a data acquisition condition 823, a related data coupling table ID 824, and a configuration time of day 825. The rule ID 821 is an identifier of a rule for extracting the related data and corresponds to the rule ID 805. The data search target 822 retains information of a database or a table which is a search target with the relevant rule ID 821, that is, information of the configuration data 3, the supplementary data management table 4, the graph-form database ID (302 or 401), etc. The data acquisition condition 823 defines a method for acquiring the data from the relevant data search target 822.

The related data coupling table ID 824 is an identifier of a related data coupling table 9 which is expressed as a table formed by coupling the information of the data acquired by the data acquisition condition 823 into one information. The details of the related data coupling table 9 will be explained later by using FIG. 9. The configuration time of day 825 is a specified time of day when the related data coupling table 9 corresponding to the related data coupling table ID 824 was registered or updated.

In the example in FIG. 8, two rules are defined. R001 which is a first rule is a rule which is registered from the related data request screen 51-2 illustrated in FIG. 6 and is to extract the related data corresponding to a request regarding which the management flow is "F001," the output information is the "Test Processing," the search sort key is "Asset ID & Product ID," and the additional request upon output is "None." The data search target 822 is a "Graph-Form Database ID: GDB0001, Supplementary Data Management Table"; and the data acquisition condition 823 is a condition reciting that "Acquire test processing implemented data and test result valid range data which are retained by Asset." It is indicated that under this condition, the related data coupling table ID 824 "T001" was registered or updated at the configuration time of day 825 "2021/2/7 08:03:00.000." The update time of day of the A02 test result valid range data 40322 which is the newest update time of day among the update times of day 404 indicated in FIG. 4 is reflected in the configuration time of day 825.

R002 which is a second rule is a rule which is registered from the related data request screen 51-1 illustrated in FIG. 5 and is to extract the related data corresponding to a request regarding which the management flow is "F001," the output information is the "Asset ID," the search sort key is the "Product ID," and the additional request upon output is the "sequential order." The data search target 822 is a "Graph-Form Database ID: GDB0001, Configuration Data"; and the data acquisition condition 823 is to "Acquire node(s) identified with Product ID, which is search sort key, and Asset ID, which is output information, and information of connection relation; and if there is no relevant sequential order connection, superior or inferior sequential order is tracked" and the data which satisfies the condition is to be acquired. It is indicated that under this condition, the related data coupling table ID 824 "T002" was registered or updated at the configuration time of day 825 "2021/2/7 09:10:00.000." The time of day which is the time of day 301 indicated in FIG. 3 is reflected in the configuration time of day 825.

<Related Data Coupling Table>

FIG. 9 is an explanatory diagram illustrating an example of the related data coupling table 9. The related data coupling table 9 is a general term of a table group configured based on the data extraction rules illustrated in FIG. 8. FIG. 9 explains an example of a related data coupling table 91 whose related data coupling ID is T001, and a related data coupling table 92 whose related data coupling ID is T002.

The related data coupling table 91 retains information of a related data coupling table ID 911, a management flow ID 912, and a configuration time of day 913, which respectively retain information of "T001," "F001," and "2021/2/7 08:03:00.000" on the basis of the data extraction rules 8.

Furthermore, the related data coupling table 91 is expressed as a table including fields of an Asset ID 914, a product ID 915, a "Test: Implemented/Not Implemented" 916, and a "Test Value: Valid Range" 917. The Asset ID 914 and the product ID 915 are search sort keys and are provided based on the search sort key 803 of the data extraction rules 8. The "Test: Implemented/Not Implemented" 916 and the "Test Value: Valid Range" 917 are extracted values and are the fields acquired and coupled based on the conditions indicated in the data search target 822 and the data acquisition condition 823 of the data extraction rules 8.

In the example in FIG. 9, the A01 test processing implemented data 40311 and the A01 test result valid range data 40312 are acquired for the Asset with the ID "A01" and are coupled together according to the Asset ID 914 and the product ID 915 which are the search sort keys.

Incidentally, although it is not illustrated in FIG. 9, the A02 test processing implemented data 40321 and the A02 test result valid range data 40322 may be acquired in the same manner for the Asset with the ID "A02" and be coupled to the related data coupling table 91.

The related data coupling table 92 retains information of a related data coupling table ID 921, a management flow ID 922, and a configuration time of day 923, which respectively retain information of "T002," "F001," and "2021/2/7 09:10:00.000" on the basis of the data extraction rules 8.

Furthermore, the related data coupling table 92 is expressed as a table including fields of a product ID 924 and an "Asset ID: Sequential Order" 925. The product ID 924 is a search sort key and is provided based on the search sort key 803 of the data extraction rules 8. The "Asset ID: Sequential Order" 925 is an extracted value and is the field acquired and created based on the conditions indicated in the data search target 822 and the data acquisition condition 823 of the data extraction rules 8. In the example in FIG. 9, the information of the Asset ID's are aligned with respect to each product ID 924 in the sequential order in accordance with a logical relation of the sequential step order indicated with dashed lines in the reference example 300 in FIG. 3. Incidentally, although it is not illustrated in FIG. 9 or FIG. 3, data with the product ID's such as S03 may be acquired in the same manner and be coupled to the related data coupling table 92.

<Example of Sequence for Acquisition of Related Data>

Figure 10:
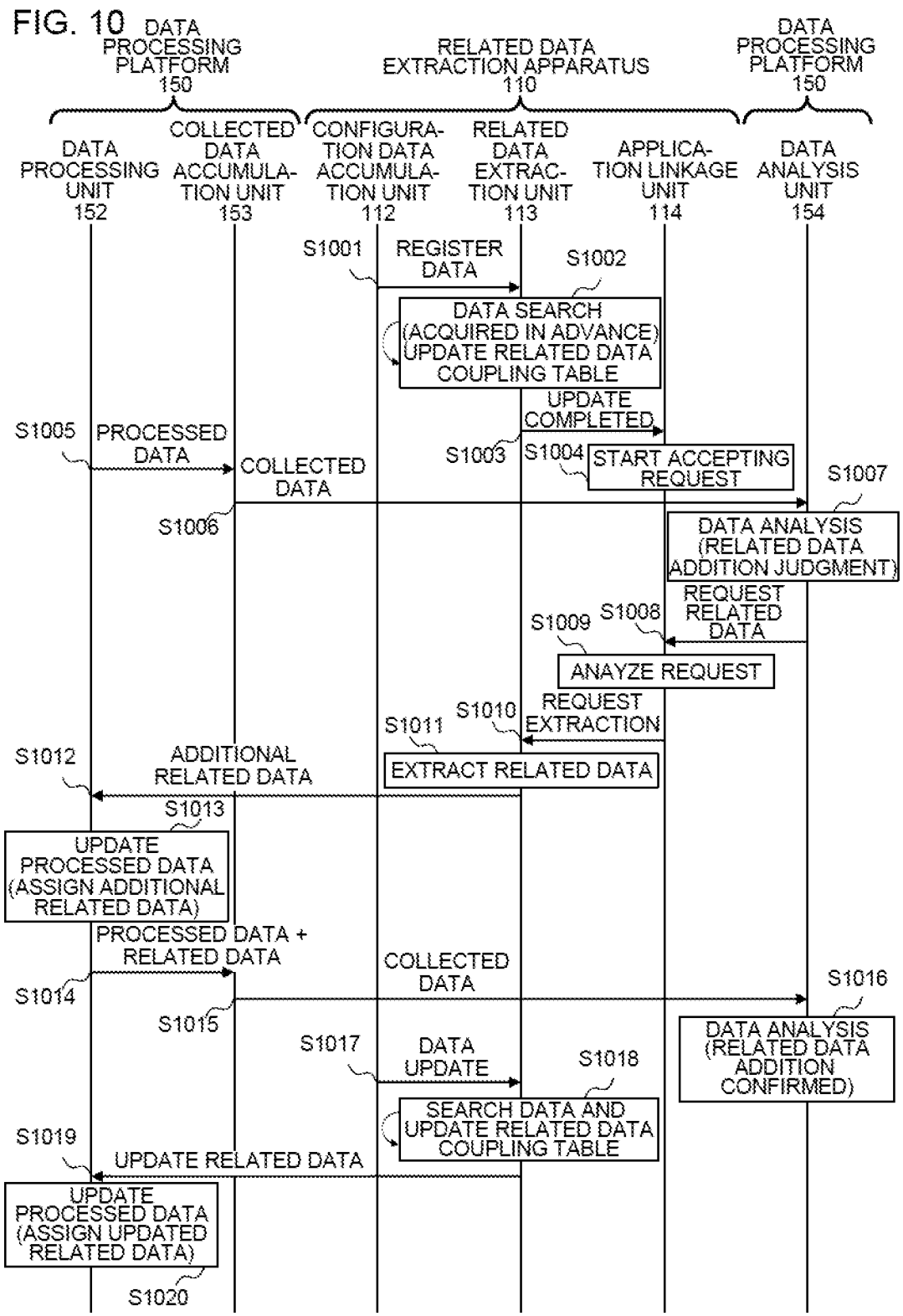
FIG. 10 is a sequence illustrating an example of related data acquisition between the related data extraction apparatus and a data processing platform.

FIG. 10 is a sequence diagram illustrating an example of acquisition of the related data between the related data extraction apparatus 110 and the data processing platform 150. FIG. 10 illustrates an example where, for example, information of the configuration data 3 and the supplementary data management table 4 is registered and the data analysis unit 154 requests the related data and receives the related data.

(Processing Upon Registration of Data in Configuration Data 3 and Supplementary Data Management Table 4)

Firstly in step S1001, when the configuration data accumulation unit 112 detects registration of information in the configuration data 3 or the supplementary data management table 4, it notifies the related data extraction unit 113 of the data registration. Next in step S1002, the related data extraction unit 113 searches for the data of the configuration data 3 and the supplementary data management table 4 on the basis of the data extraction rules 8 and updates the related data coupling table 9. Then, in step S1003, the configuration data accumulation unit 112 notifies the application linkage unit 114 of the update completion. Subsequently in step S1004, when receiving the update completion, the application linkage unit 114 starts accepting a request to the related data request screen 51 with the relevant management flow ID.

Next in step S1005, the data processing unit 152 shapes the data collected by the data collection unit 151 and stores it in the collected data 155 of the collected data accumulation unit 153. Then in step S1006, the data analysis unit 154 reads the collected data stored in the collected data 155.

Subsequently in step S1007, the data analysis unit 154 analyzes the data read from the collected data 155 and judges whether it is necessary to add the related data or not. In step S1008, if it is necessary to add the related data, the data analysis unit 154 makes a request to the application linkage unit 114, via the screen display unit 5 or the like, for information to be given as the related data. Next in step S1009, the application linkage unit 114 analyzes the information request accepted from the data analysis unit 154. Then in step S1010, the application linkage unit 114 notifies the related data extraction unit 113 of a related data extraction request by including information such as the management flow, the search sort key, the output information, and the additional request upon output according to the analysis result of the information request accepted from the data analysis unit 154.

Subsequently, in step S1011, when receiving the extraction request from the application linkage unit 114, the related data extraction unit 113 extracts the related data by referring to the data extraction rules 8 and the related data coupling table 9. Next in step S1012, the related data extraction unit 113 notifies the data processing unit 152 of the extracted related data as additional related data. A detailed example of the processing of the related data extraction unit 113 will be described later by using FIG. 11.

Then in step S1013, when receiving the additional related data from the related data extraction unit 113, the data processing unit 152 updates processed data to give the additional related data to it; and the additional related data is given when the data collection unit 151 shapes the collected data. Subsequently, in step S1014, the data processing unit 152 stores the processed data, to which the additional related data is given, in the collected data 155 of the collected data accumulation unit 153. Next in step S1015, the data analysis unit 154 reads the processed data, to which the additional related data stored in the collected data 155 of the collected data accumulation unit 153 is given. Then in step S1016, when analyzing the processed data read in step S1015, the data analysis unit 154 checks the addition of the related data.

(Processing Upon Update of Configuration Data 3 and Supplementary Data Management Table 4)

In step S1017 after step S1016, when detecting an update of the information of the configuration data 3 or the supplementary data management table 4, the configuration data accumulation unit 112 notifies the related data extraction unit 113 that the data has been updated. Next in step S1018, when being notified of the update of the configuration data 3 or the supplementary data management table 4 by the configuration data accumulation unit 112, the related data extraction unit 113 searches for the data of the configuration data 3 and the supplementary data management table 4 on the basis of the data extraction rules 8 and updates the related data coupling table 9. Then in step S1019, the related data extraction unit 113 notifies the data processing unit 152 of the updated information of the related data coupling table 9 as update related data in response to the extraction request received in S1010. Subsequently in step S1020, the data processing unit 152 gives the updated related data, which was received from the related data extraction unit 113, to the processed data and thereby updates the processed data.

<Example of Processing Flowchart>

Figure 11:
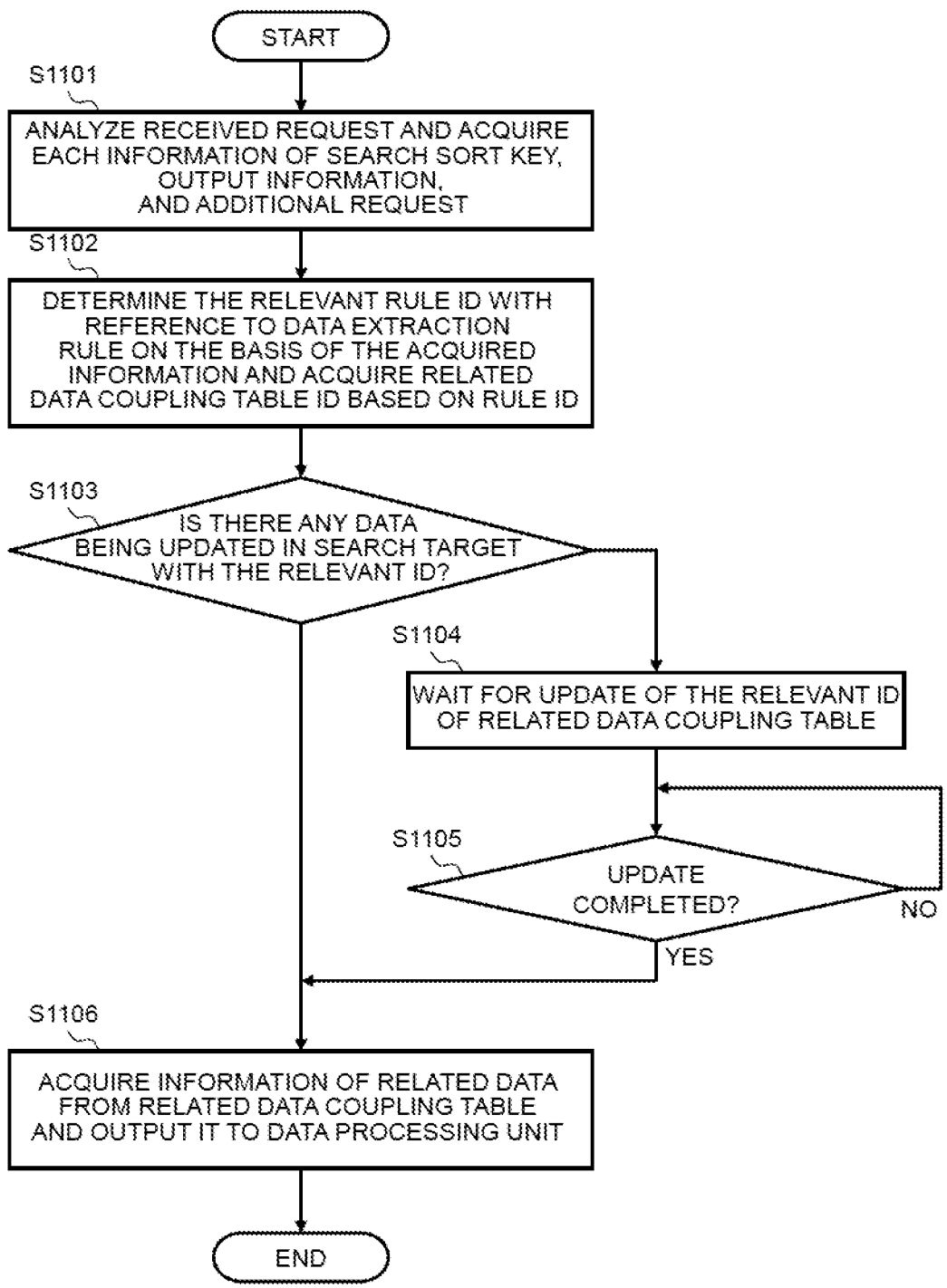
FIG. 11 is a flowchart illustrating related data extraction processing of the related data extraction apparatus.

FIG. 11 is a flowchart illustrating the details of the processing of the related data extraction apparatus 110. An example in FIG. 11 illustrates the outline of the processing of the related data extraction apparatus 110 for accepting a request for the related data to be added for the purpose of analysis from the data analysis unit 154, extracting the relevant related data, and outputting it to the data processing unit 152. After accepting the request for the related data, the related data extraction apparatus 110 executes the processing illustrated in the flowchart below.

Firstly in step S1101, the related data extraction apparatus 110 analyzes the received request for the related data and acquires each information of the search sort key, the output information, and the additional request. This corresponds to step S1008 to step S1009 of the application linkage unit 114 illustrated in FIG. 10.

Next in step S1102, the related data extraction apparatus 110 determines the relevant rule ID 805 (which may be 821) by referring to the data extraction rules 8 on the basis of the acquired information and acquires the related data coupling table ID 824 based on the rule ID 805.

Then in step S1103, the related data extraction apparatus 110 judges whether or not any data which is being updated exists in the data search target 822 with the relevant rule ID 805 determined in step S1102. If the related data extraction apparatus 110 determines that the data which is being updated exists, the processing proceeds to step S1104; and if the related data extraction apparatus 110 determines that the data which is being updated does not exist, the processing proceeds to step S1106.

In step S1104, the related data extraction apparatus 110 waits for an update of the related data which corresponds to the relevant rule ID 805 in the related data coupling table ID 824. Next in step S1105, the related data extraction apparatus 110 judges whether the update for which it waited in step S1104 has been completed or not. If the related data extraction apparatus 110 determines that the update has been completed, the processing proceeds to step S1106. In FIG. 11, step S1105 is repeated until it is determined that the update has been completed; however, if the update does not end, the processing illustrated in FIG. 11 may be terminated by means of a timeout or the like.

In step S1106, the related data extraction apparatus 110 acquires the information of the related data from the related data coupling table 9 on the basis of the related data coupling table ID 824 and outputs it to the data processing unit 152. The processing form step S1102 to step S1106 corresponds to step S1010 to step S1012 of the related data extraction unit 113 illustrated in FIG. 10. After step S1106, the processing illustrated in FIG. 11 is terminated.

<Example of Giving Related Data>

FIG. 12 is an explanatory diagram illustrating an example of giving the related data to the data collected by the data processing platform.

Data 1200-1, data 1200-2, and data 1200-3: are the collected data before the related data is given; and are the collected data shaped by the data processing unit 152 in step S1005 illustrated in FIG. 10. The data 1200-1 to the data 1200-3 will be hereinafter collectively referred to as the "data 1200." The data 1200 shows an example of the collected data acquired from the sensor 131 or the equipment 132 with the Asset ID "A01" and includes information of the result of each test implemented at A01 with respect to each product ID. Specifically, the data 1200-1 includes information of "Asset ID: A01, Product ID: 01, Test 1 Result: 10, Test 2 Result: 20, Test 3 Result: 15, and Test 4 Result: 30."

Data 1201-1, data 1201-2, and data 1201-3 are: the collected data after the related data extracted based on the rule ID "R001" illustrated in FIG. 8 is given to each of the data 1200-1, the data 1200-2, and the data 1200-3; and are examples of the collected data shaped together with the related data by the data processing unit 152 in step S1014 illustrated in FIG. 10. The data 1201-1 to the data 1201-3 will be collectively referred to as the "data 1201."

Regarding the data 1201, information of whether each test has been implemented or not implemented, and a valid range of each test value is added to each data of the data 1200. Specifically speaking, regarding the data 1201-1, information of "Test 1 Implemented: 1 (the test has been executed (the same applies hereinafter)), Test 2 Implemented: 1, Test 3 Implemented: 1, Test 4 Implemented: 1, Test 1 Range: 0-20, Test 2 Range: 0-50, Test 3 Range: 10-100, Test 4 Range: 20-90" is added to the data of the data 1200-1.

By collecting the data 1201, the data analysis unit 154 can determine whether or not it is necessary to use the result of each test implemented at A01 as the data. For example, the data 1200-2 includes information of "Test 2 Result: 0 (the test has not been executed (the same applies hereinafter))," but it is sometimes difficult to judge whether Test 2 is not executed with the product S02, whether it is a correct value, or whether it is available data. The data 1201-2 includes information of "Test 2 Implemented: 0," it may be judged that the test 2 is not executed. Furthermore, the data 1200-3 includes information of "Test 3 Result: −5," but it is sometimes difficult to judge whether Test 3 has been executed correctly with the product S03, and whether it is an abnormal value. The data 1201-3 includes information of "Test 3 Implemented: 1 and Test 3 Range: 10-100," so that the test 3 has been executed, but it is a value outside the valid range (an outlier or an invalid value) and, therefore, it may be judged as an abnormal result.

Data 1202-1 and data 1202-2 are: the data after the related data extracted based on the rule ID "R002" illustrated in FIG. 8 is given to the data 1200-1 and the data 1200-2, respectively; and are other examples of the collected data shaped together with the related data by the data processing unit 152 in step S1014 illustrated in FIG. 10. The data 1202-1 and the data 1202-2 will be collectively referred to as the "data 1202." Regarding the data 1202, information of passing apparatuses are added to each data of the data 1200. Specifically speaking, regarding the data 1202-1, information of the passing apparatuses "A01, A02, A03, A04, A05, A06, A07, A08" is added to the data of the data 1200-1.

By collecting the data 1202, the data analysis unit 154 can determine all the Assets to pass with respect to each product ID and their sequential order. For example, regarding the data 1200, it can be determined the products of the respective product ID's are processed at the equipment with the Asset ID "A01"; however, it may be sometimes difficult to determine how they are processed. The data 1202-1 includes information of the passing apparatuses "A01, A02, A03, A04, A05, A06, A07, A08"; and it may be determined that the product with the product ID "S01" is processed as it passes through each Asset of A01 to A08. Furthermore, the data 1202-2 includes information of the passing apparatuses "A01, A02, A04, A05, A06, A08"; and it may be determined that the product with the product ID "S02" does not pass through the Assets A03 and A07.

<Example of Version Management>

FIG. 13 is an explanatory diagram illustrating an example of version management of the related data extraction apparatus 110. The related data extraction apparatus 110 may manage a history of the generated related day by means of a version management table 1300 including, for example, fields of an extraction rule 1301, a version 1302, a creation time of day 1303, generated data 1304, and a configuration time of day 1305.

The extraction rule 1301 is an identifier of a rule for extracting the related data and corresponds to the rule ID 805 illustrated in FIG. 8. The version 1302 is a name indicating a history such as version information of the generated related data. The creation time of day 1303: is a time of day when the relevant related data was generated; and is a time of day when the related data extraction unit 113 acquires the information of the related data from the related data coupling table 9. The generated data 1304 retains the content of the related data coupling table 9 at the creation time of day 1303. The configuration time of day 1305: is a specified time of day when the related data coupling table 9 was registered or updated; and corresponds to the configuration time of day 825 illustrated in FIG. 8.

FIG. 13 illustrates an example where the version 1302 of the related data created according to the extraction rule 1301 "R001" was updated from "Ver 1" to "Ver 2" and information relating to an updated part is indicated in boldface. In the example in FIG. 13, let us assume that in two tests of Test 2 and Test 3 executed by the Asset "A01," information indicating the valid range of the test results among the A01 test result valid range data 40312 has been updated. The update time of day 404 of the supplementary data management table 4 is updated from "2021/2/7 08:01:00.000" to "2021/2/9 15:01:00.000" and the configuration time of day 825 of the rule search table 82 is updated in the same manner. It is shown that the related data of "Ver 2" is generated at "2021/2/9 15:01:30.000" in the version management table 1300 and the data which is then generated is information with the related data coupling table ID "T001", which was updated at "2021/2/9 15:01:00.000."

According to this embodiment as described above, the related data extraction apparatus 110 can extract the related data in response to the request from the data analysis unit 154. Therefore, it is possible to flexibly provide the meta data according to the application. Furthermore, according to this embodiment, the data extraction rules 8 are provided and the related data coupling table 9 is configured in advance, so that it is possible to flexibly deal with the various system configuration information 121 and shorten time to provide the related data.

The following operational advantages can be obtained according to the aforementioned embodiment.

(1) The related data extraction apparatus 110 includes: the configuration data accumulation unit 112 that manages the system configuration information 121; the configuration data input unit 111 that accepts input of registration or update of the system configuration information 121; the application linkage unit 114 that accepts information of a request from the data analysis unit 154 for the related data to be given; and the related data extraction unit 113 that creates the related data by referring to the data managed by the configuration data accumulation unit 112 on the basis of the information accepted by the application linkage unit 114. Therefore, it is possible to provide the related data in response to the request from the data analysis unit 154. Regarding the request herein used, the desired content varies, for example, depending on the type of the application which performs the analysis. in this embodiment, the related data is created by referring to the data managed by the configuration data accumulation unit 112 on the basis of the information accepted by the application linkage unit 114, so that it is possible to flexibly provide the related data, that is, the meta data.

(2) The information accepted by the application linkage unit 114 includes information for requesting the entire apparatus configuration and the sequential order. The application linkage unit 114 requests the related data extraction unit 113 to extract the related data by setting, for example, the search sort key as the "Product ID," the output information as the "Asset ID," and the additional request upon output as the "sequential order"; and the related data extraction unit 113 creates the relevant related data from the configuration data 3 managed by the configuration data accumulation unit 112.

(3) The information accepted by the application linkage unit 114 includes information for requesting a judgment of whether or not it is necessary to use data such as whether an outlier(s) or an invalid value(s) exist or not. The application linkage unit 114 requests the related data extraction unit 113 to extract the related data by setting the search sort key as "Asset ID & Product ID," the output information as "Test Processing," and the additional request upon output as "None"; and the related data extraction unit 113 creates the relevant related data from the supplementary data management table 4 managed by the configuration data accumulation unit 112.

(4) The configuration data accumulation unit 112 manages the system configuration information 121 by dividing it into a plurality of pieces of information such as the configuration data 3 and the supplementary data management table 4. Therefore, the application linkage unit 114 selects a range to be referenced (the storage unit) according to the accepted information and extracts the related data from the selected range. Consequently, it is possible to distribute loads in the storage areas and promptly extract the related data.

(5) The related data extraction unit 113 includes the data extraction rules 8 and configures the related data coupling table 9 in advance; and when the application linkage unit 114 accepts a new request, the related data extraction unit 113 extracts the related data which satisfies the request from the related data coupling table 9. Therefore, it is possible to shorten time to provide the related data created from the data distributed and stored in the plurality of storage units.

(6) Each of the configuration data 3 and the supplementary data management table 4 includes the time-of-day information to update the data of the system configuration information 121 and each of the data extraction rules 8 and the related data coupling table 9 includes their time-of-day information. Furthermore, when the application linkage unit 114 accepts a new request, the related data extraction apparatus 110 stores the time of day when the related data which satisfies the new request is created. Therefore, it is possible to manage generations of the system configuration information 121, the data extraction rules 8, the related data coupling table 9, and the related data based on these information.

(7) The related data extraction system 1 includes the related data extraction apparatus 110 and the data processing platform 150. The data processing platform 150 can request the related data extraction apparatus 110 to give the related data and acquire the requested related data from the related data extraction apparatus 110.

(Variation 1)

In the aforementioned embodiment, the related data extraction apparatus 110 judges whether there is any data being updated in the data search target 822 with the relevant rule ID 805 in FIG. 11 and performs processing to wait for an update of the related data coupling table ID 824 if the data which is being updated exists; however, the related data before the update and the related data after the update may be respectively output to the data processing unit 152 without waiting for the update.

(Variation 2)

In the aforementioned embodiment, the related data extraction apparatus 110 creates the related data coupling table 9 in steps S1001 to S1004 in FIG. 10 and then the application linkage unit 114 starts accepting a request to the related data request screen 51 with the relevant management flow ID; however, the creation of the relevant related data coupling table 9 may be started after accepting the request. In this case, the results acquired from the data search target 822 and the data acquisition condition 823 may be output respectively as the related data to the data processing unit 152 before the creation of the relevant related data coupling table 9 is completed. Furthermore, in this case, the related data with which the results acquired from the data search target 822 and the data acquisition condition 823 are combined may be output to the data processing unit 152 after the creation of the relevant related data coupling table 9 is completed.

(Variation 3)

In the aforementioned embodiment, the related data extraction apparatus 110 outputs the related data to the data processing unit 152; however, the related data may be output to another functional block of the data processing platform 150. For example, a case of outputting the related data to the data analysis unit 154 may be possible. In this case, the data analysis unit 154 may process the related data by linking the related data to the collected data.

(Variation 4)

The aforementioned embodiment is designed so that the related data extraction system 1 causes the supplementary data to be selected from the data managed by the supplementary data management table 4. However, without limitation to this example, whether any data with hits by a search based on a keyword input by a user exists in the supplementary data management table 4 or not may be judged and the data hit by the search may be defined as the supplementary data. Consequently, it is possible to enhance flexibility in selecting and changing the supplementary data.

(Variation 5)

In the aforementioned embodiment, the supplementary data can be set with much finer granularity on the related data request screen (FIG. 5 and FIG. 6). For example, regarding the 2nd input fields 512-1, 512-2 "Test Processing: Valid/Invalid" may be changed so that, for example, the test processing data and the test result valid range data can be selected individually or each item can be selected individually.

(Variation 6)

Regarding the data extraction requirement (FIG. 8), a column of a requirement ID maybe added to distinguish the respective records from each other. In that case, the supplementary data in FIG. 12 may be listed for each requirement ID. For example, if the respective pieces of the supplementary data with the requirement ID's 1 and 2 are given to the data 1200-1, the supplementary data with the requirement ID 1 are listed and then the supplementary data with the requirement ID 2 are listed regarding the data 1201-1.

In the aforementioned embodiment and variations, the configurations of the functional blocks are merely example. Some functional configurations indicated as separate functional blocks may be configured integrally or the configuration expressed in one functional block diagram may be divided into two or more functions. Furthermore, part of a function which each functional block has may be configured to be possessed by another functional block. Furthermore, a screen display method is also merely an example. The layout, text, and designs of the screen may be changed.

Incidentally, the present invention is not limited to the aforementioned embodiments, but includes various variations and equivalent configurations within the gist of the attached claims. For example, the aforementioned embodiments have been described in detail in order to explain the present invention in an easily comprehensible manner and are not necessarily limited to those having all the configurations explained above. Furthermore, part of the configuration of a certain embodiment can be replaced with the configuration of another embodiment. Also, the configuration of another embodiment can be added to the configuration of a certain embodiment. Moreover, regarding part of the configuration of each embodiment, it is possible to add, delete, or replace the other configuration. Furthermore, various kinds of processing functions may be integrated and distributed as appropriate for the sake of processing efficiency or implementation efficiency. Similarly, storage area for storing various kinds of data may be integrated and distributed as appropriate for the sake of processing efficiency or implementation efficiency.

Furthermore, each of the aforementioned configurations, functions, processing units, processing means, etc. may be implemented by hardware by, for example, designing part or all of such configurations, functions, processing units, and processing means by using integrated circuits or the like, or may be realized by software by processors interpreting and executing programs for realizing each of the functions.

Information such as programs, tables, and files for realizing each of the functions of the related data extraction apparatus or the related data extraction system may be stored in memories, storage devices such as hard disks and SSDs (Solid State Drives), or storage media such as IC (Integrated Circuit) cards, SD cards, and DVDs (Digital Versatile Discs). Alternatively, the information such as programs, tables, and files for realizing each of the functions may be acquired from an external computer(s) equipped with a non-transitory storage device(s) through communications via the communication I/F 205. Alternatively, the information such as programs, tables, and files for realizing each of the functions may be recorded in a non-transitory recording medium/media and acquired by being read by a medium reading device.

Furthermore, control lines and information lines which are considered to be necessary for the explanation are indicated; however, not all control lines or information lines are necessarily indicated in terms of implementation. Practically, it may be assumed that almost all components are connected to each other.

What is claimed is:

1. A related data extraction apparatus for extracting related data which is to be added to data collected from a target system and is related to the data, the related data extraction apparatus comprising:
    a memory storing a program for extracting the related data; and
    a processor coupled to the memory, wherein the program causes the processor to:
    manage configuration information of the target system;
    accept input of registration or update of the configuration information;
    accept a request for the related data to be added to the data by an application for analyzing the data; and
    extract the related data from the configuration information in response to receiving the request;
    wherein the configuration information is managed by a plurality of storage units;
    wherein the processor selects a storage unit from the plurality of storage units according to the request and refers to the configuration information managed by the selected storage unit; and
    wherein the processor configures in advance a combination of the request and the related data created by reading the configuration information, which is stored in the plurality of storage units respectively, from the plurality of storage units on the basis of the request and stores the combination as related data combined information; and when the processor accepts a new request, the processor creates the related data which satisfies the new request from the related data combined information.

2. The related data extraction apparatus according to claim 1,
    wherein the request includes a request for supplementary data relating to the data analyzed by the application; and
    wherein the processor extracts the related data which satisfies the request by referring to the configuration information by using the data analyzed by the application.

3. The related data extraction apparatus according to claim 2,
    wherein the request includes a request for configuration data including an arrangement configuration or arrangement order of equipment for the target system.

4. The related data extraction apparatus according to claim 2,
    wherein the request includes a request for information which is a basis for a judgment of whether or not it is necessary to use data in the application.

5. The related data extraction apparatus according to claim 1,
    wherein the plurality of storage units stores time-of-day information when each piece of the configuration information stored in each of the storage units is registered or updated; and
    wherein when configuring in advance the combination of the related data created from each piece of the configuration information stored in the plurality of storage units, the processor stores the time-of-day information; and when the processor accepts the new request, the processor stores a time of day when the related data which satisfies the new request is created.

6. The related data extraction apparatus according to claim 1, wherein the processor:
    analyzes the request and acquires each piece of information of a search sort key, output information, and an additional request;
    identifies corresponding data of the related data combined information on the basis of each piece of the acquired information; and
    if the identified data of the related data combined information is not being updated, creates the related data which satisfies requirements from the related data combined information; and if the identified data of the related data combined information is being updated, creates the related data which satisfies the request from the related data combined information after completion of the update of the data.

7. The related data extraction apparatus according to claim 1, further comprising a screen for accepting input of the request by a user.

8. The related data extraction apparatus according to claim 1, further comprising a management screen for managing the configuration information.

9. A related data extraction system comprising:
the related data extraction apparatus according to claim 1; and
a data processing platform that collects the data from the target system,
wherein the data processing platform includes an application for analyzing the data collected, requests the related data to be added to the data from the related data extraction apparatus, acquires the related data from the related data extraction apparatus, and gives the related data to the data.

10. A related data extraction method executed by a related data extraction apparatus for extracting related data which is to be added to data collected from a target system and is related to the data, the related data extraction method comprising:
managing, by a processor in the related data extraction apparatus, configuration information of the target system;
accepting input of registration or update of the configuration information;
accepting a request for the related data to be added to the data by an application for analyzing the data; and
extracting the related data from the configuration information in response to receiving the request;
wherein the configuration information is managed by a plurality of storage units;
wherein the processor selects a storage unit from the plurality of storage units according to the request and refers to the configuration information managed by the selected storage unit; and
wherein the processor configures in advance a combination of the request and the related data created by reading the configuration information, which is stored in the plurality of storage units respectively, from the plurality of storage units on the basis of the request and stores the combination as related data combined information; and when the processor accepts a new request, the processor creates the related data which satisfies the new request from the related data combined information.

11. A non-transitory computer-readable medium storing a related data extraction program for causing a computer to function as a related data extraction apparatus to execute a process, the process comprising:
managing, by a processor in the computer, configuration information of a target system;
accepting input of registration or update of the configuration information;
accepting a request for a related data to be added to data by an application for analyzing data collected from the target system; and
extracting the related data from the configuration information in response to receiving the request;
wherein the configuration information is managed by a plurality of storage units;
wherein the processor selects a storage unit from the plurality of storage units according to the request and refers to the configuration information managed by the selected storage unit; and
wherein the processor configures in advance a combination of the request and the related data created by reading the configuration information, which is stored in the plurality of storage units respectively, from the plurality of storage units on the basis of the request and stores the combination as related data combined information; and when the processor accepts a new request, the processor creates the related data which satisfies the new request from the related data combined information.

12. A non-transitory computer-readable medium storing a related data extraction program for causing a computer to function as a data processing platform to execute a process, the process comprising:
collecting data from a target system;
analyzing the data by a processor of the computer;
requesting a related data from a related data extraction apparatus;
acquiring the related data from the related data extraction apparatus; and
adding the related data to the data by the processor;
wherein the configuration information is managed by a plurality of storage units;
wherein the processor selects a storage unit from the plurality of storage units according to the request and refers to the configuration information managed by the selected storage unit; and
wherein the processor configures in advance a combination of the request and the related data created by reading the configuration information, which is stored in the plurality of storage units respectively, from the plurality of storage units on the basis of the request and stores the combination as related data combined information; and when the processor accepts a new request, the processor creates the related data which satisfies the new request from the related data combined information.

* * * * *